United States Patent [19]
Williams

[11] 3,766,776
[45] Oct. 23, 1973

[54] METHOD FOR DETERMINING THE DURABILITY OF PELLETS AND APPARATUS THEREFOR

[75] Inventor: Merl A. Williams, Craigville, Ind.

[73] Assignee: Central Soya Company, Fort Wayne, Ind.

[22] Filed: Mar. 31, 1972

[21] Appl. No.: 240,179

[52] U.S. Cl. .................. 73/78, 73/12, 73/88 R, 241/69
[51] Int. Cl. ............................................. G01n 3/00
[58] Field of Search .................. 73/7, 12, 15.4, 78, 73/87, 88 R, 432 PS; 209/236, 237, 238, 350, 372; 241/69, 70

[56] References Cited
UNITED STATES PATENTS

| | | | |
|---|---|---|---|
| 3,465,972 | 9/1969 | Ardary | 241/69 |
| 970,373 | 9/1910 | Hemstreet | 73/12 X |
| 1,459,143 | 6/1923 | Curran | 73/12 X |
| 2,995,026 | 8/1961 | Schmidt | 73/12 |

Primary Examiner—Charles A. Ruehl
Attorney—Dawson, Tilton, Fallon & Lungmus

[57] ABSTRACT

A method for determining the durability of pellets (such as animal feed pellets) to ascertain at the beginning of a large scale production run whether the pellets are of acceptable quality: which includes: introducing a predetermined sized sample of pellets from the output of a pellet making machine into a screened-walled container, cooling the pellets followed by limited agiation for separating fine particles after which the container is tumbled to collect fine particles and finally comparing the thus collected fine particles against a predetermined standard.

7 Claims, 7 Drawing Figures

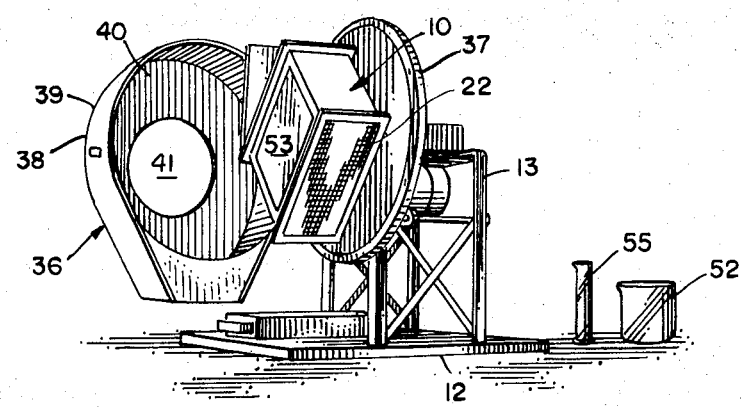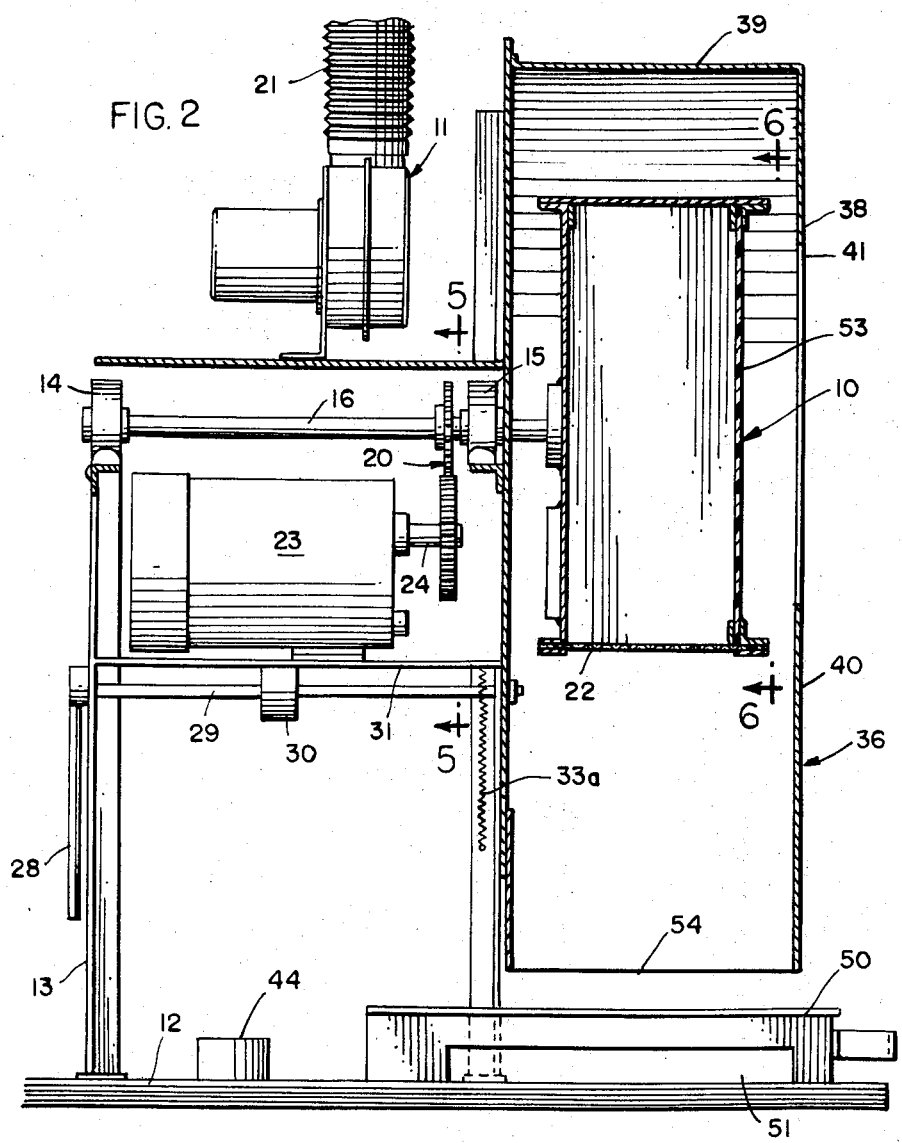

METHOD FOR DETERMINING THE DURABILITY OF PELLETS AND APPARATUS THEREFOR

BACKGROUND AND SUMMARY OF THE INVENTION

Pellets, particularly those for feeding animals desirably have a certain degree of hardness or durability. It will be appreciated that readily frangible pellets may result in fine particles which are not eaten by the animals and thereby deprive the animal of nutriment as well as constituting an expense to the husbandryman. Recognizing this, manufacturers of such feed pellets attempt to meet the desirable standards of durability. Inasmuch as the feed pellets are produced in high volume at high speed, it is important for the manufacturer to determine early in a production run whether the prescribed standards are met — otherwise sub-standard pellets will be produced in quantity which may have to be reprocessed or thrown away. Illustrative of the procedure and apparatus employed in the production of such pellets is the co-owned U. S. Pat. No. 2,978,326. The above patent discloses a pellet producing machine, the output of which is delivered to a pellet cooler. It is in this environment where the instant invention is useful — taking a pre-determined sized sample of pellets from the pellet machine and prior to the time the production run pellets have gone through the pellet cooler in large quantity. The sample is cooled and limitedly agitated so as remove those fine particles which normally would be removed in the commercial process screening. Thereafter, the pellets are tumbled for a predetermined time while the fine particles are collected and the collected particles compared against a predetermined standard which reveals the acceptability of the pellets insofar as durability and hardness is concerned. The apparatus employed in this is compact but which yields a quick and reliable procedure employable by the manufacture before the production run is too far along. The apparatus is compact and readily portable and can be operated by plant personnel with a minimum of instruction. Other objects and advantages of the invention will appear as this specification proceeds.

DETAILED DESCRIPTION

The invention is described in conjunction with an illustrative embodiment, in which:

FIG. 1 is a perspective view of apparatus for practicing the invention as it would be arranged in an initial stage of the durability determining proceedure;

FIG. 2 is a side elevational view partially in section of the apparatus for practicing the invention;

PROCEDURE — GENERALLY

Figure 5:
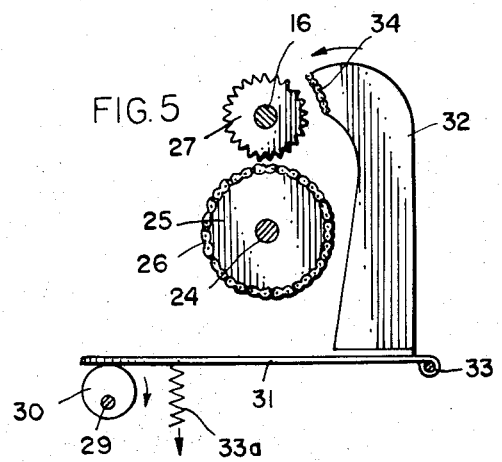
FIG. 5 is a fragmentary sectional view as would be seen along the sight line 5—5 applied to FIG. 2.

In the practice of the invention a sample of pellets coming out of a pellet machine (as shown schematically in U.S. Pat. No. 2,978,326) is introduced into the container generally designated 10 and so designated in each view except FIG. 5. Inasmuch as the pellets are relatively hot — having been subjected to a steam conditioning prior to entering the pellet machine, and inasmuch as the commercial procedure provides for the cooling of pellets, I provide a cooling slip in the testing procedure. For that purpose a blower unit generally designated 11 (see particularly FIGS. 2 and 3) is provided. This can be coupled to the container 10 for air cooling of the pellet sample.

Thereafter the pellet sample is agitated in a limited fashion — as by rocking the container 10 so as to cause fine particles to exit through the bottom screen. In production, the pellets are subjected to a screening which takes out a certain amount of the "fines" and the durability testing procedure therefore advantageously provides for a counterpart operation.

Following the removal of the "fines" by the limited rocking, the pellets are tumbled for a predetermined time — as by rotating the container 10. Thereafter the fine particles are collected and compared with a standard to determine whether the pellets tested meet acceptable values.

STRUCTURAL DETAILS

Apparatus for carrying out the procedure just outlined in general includes a base 12 (see FIGS. 1–4) this advantageously may be constructed of plywood or other suitable material of construction and supports all of the elements of the apparatus necessary for the complete testing. Thus, the apparatus can be conveniently packaged and moved from location to location or from plant to plant, as necessary.

Figure 3:
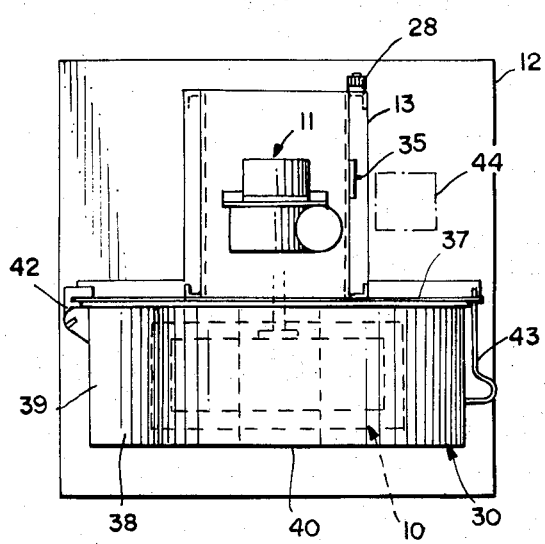
FIG. 3 is a top plan view of the apparatus of FIG. 2.
Figure 4:
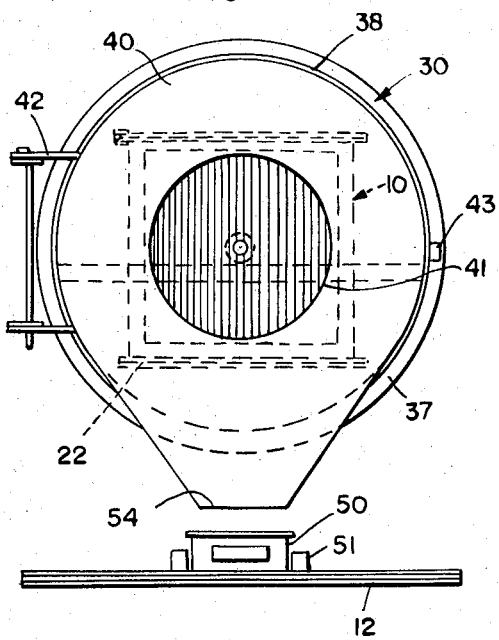
FIG. 4 is a front elevational view of the apparatus of FIGS. 2 and 3.

Fixedly supported on the base 12 is a frame 13 (see FIGS. 1–3). The frame 13 provides pedestals for two bearings 14 and 15 (see particularly FIG. 2). Journalled within the bearings 14 and 15 is a shaft 16 which at one end carries the container 10. Thus, as the shaft 16 is rotated, the container 10 also rotates.

Figure 6:
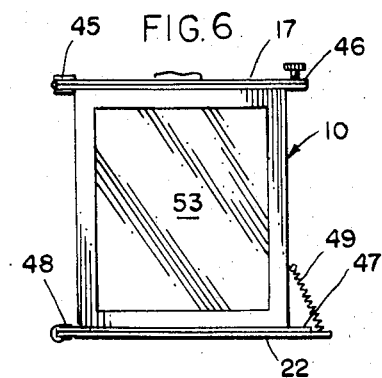
FIG. 6 is a front elevational view of the container portion of the apparatus as would be seen along the lines 6—6 applied to FIG. 2.
Figure 7:
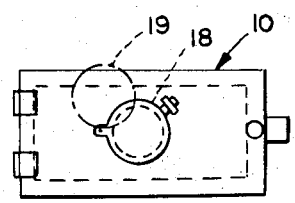
FIG. 7 is a top plan view of the container seen in FIG. 6.

It will be noted that the container 10 in its top wall or lid 17 (see FIG. 6) is equipped with an opening 18 closed by a rotatable cover 19 (see FIG. 7). When the clutch means generally designated 20 (FIG. 2) is disengaged, the shaft 16 is free to rotate and it is therefore possible to position the container 10 in such a fashion that a sample can be readily introduced into the opening 18.

The frame 13 also provides a suitable mounting for the blower unit 11 as can be seen readily in FIG. 2. The output of the blower unit 11 communicates with a flexible hose 21 which is adapted to have its other end (not shown) coupled to the opening 18. When this occurs and the blower unit is activated, air is forced through the container to cool the sample of pellets. The container 10 at its end or side opposite the lid 17 is equipped with a screened wall 22 (see also FIG. 6). Thus, air enters what normally would be the top of the container 10 (via the opening 18 in the lid 17) and passes downwardly through the pellet sample and out of the bottom screen 22. The screen 22 can be seen in perspective in the central portion of FIG. 1.

With the clutch means 20 deactivated it is possible to rotate the container 10 because the same is in a free-wheeling mode and in this condition the limited agitation or rocking of the pellet sample removes fine particles normally removed in commercial screening. After the pellet sample has been stripped of the normally removed "fines," it is subjected to a limited tumbling action which is advantageously an efficaciously achieved by the engagement of the clutch means or transmission-brake system 20 which is interposed between the motor 23 and the shaft 16. For this purpose, the output shaft 24 of the motor 23 has fixed thereon a drive disc 25. In the illustration given and with particular reference to FIG. 5, the disc is equipped on its circular periphery with a drive chain 26, thereby approximating gear means. The shaft 16 has fixed thereon a sprocket 27 which is aligned with the disc 25 and is selectively engageable with the chain 26 of the disc 25. When this occurs, rotational power from the motor 23 is delivered to the shaft 16 and then to the container 10.

Means for engaging the clutch means 20 is provided in the form of a handle 28 (see the lower left hand portion of FIG. 2). The handle 28 is fixed to a cross shaft 29 which is suitably journalled within the frame 13. Fixed to the cross shaft 29 is an eccentric collar 30 (FIGS. 2 and 5) which rotates with the shaft 29 upon rotation of the handle 28 so as to raise or lower the motor base 31 (see FIGS. 2 and 5) and thereby raise or lower the chain equipped disc 25. It will be seen from FIG. 5 that the clutch means 20 also provides for braking by virtue of an arm 32 also mounted on the motor base 31. The motor base 31 is pivotally mounted as at 33 on the frame 13 (see FIG. 5). When the handle 28 is in the "down" position, the collar 30 permits counterclockwise rotation of the motor base 31 under the urging of spring 33a so as to bring the chain links 34 of the brake arm 32 into engagement with sprocket 27 — thereby providing a positive restraint against rotation of the shaft 16 and therefore the container 10. In the handle "up" condition, the collar 30 is rotated 180° so as to bring the chain 26 of the disc 25 into engagement with the sprocket 27 which thereby couples the shaft 16 to the motor 23 and when the motor 23 is rotating, transmits rotational power to the container 10.

A toggle switch 35 (FIG. 3) is provided on the frame 13 which, in one position, can actuate the blower unit 11, in a second position actuates the motor 23 and in a third position, removes the electricity (not shown) from the two blower and motor.

An enclosure generally designated 36 (see FIG. 1) is provided for the container 10. The housing or enclosure 36 is of inverted tear-drop shape as can be readily appreciated from FIG. 4. The enclosure 36 includes a circular disc or plate 37 which is fixed to the frame 13. This constitutes the back of the enclosure 36 with the remainder of the enclosure being a unitary piece 38 which is pivotable to an open condition (compare FIG. 1 with FIGS. 2-4). As can be seen from FIGS. 1-4 the openable portion 38 includes the tear-drop shaped side wall 39 and a front conforming panel 40, the front conforming panel being equipped with an axis opening as at 41 (see FIG. 4). When the portion 38 is swung to the open condition — this made possible by the pivot mounting 42 (see FIG. 4), the container 10 is readily accessable for loading with the pellet sample, the subsequent connection of the flexible coupling 21 from the blower unit 11, and for the limited agitation to remove normally removed fine particles. However, during the tumbling phase of the operation, the portion 38 is swung to the closed condition and retained in that fashion by means of a strap latch 43 (see FIGS. 3 and 4). The base 12 also provides a support for a timer 44 (see FIG. 3) which is conveniently employed for monitoring the various times of the steps in the testing procedure.

Refering now to FIG. 6, it will be seen that the container 10 is equipped with a hinge as at 45 for completely opening the lid 17 which facilitates loading and unloading of the pellet sample. The top 17 is releasably latched in place by means of a spring bolt latch 46 (see also FIG. 6). At its bottom, the container 10 is equipped with a perimetric flange 47 to which the screen 22 is releasably secured. For this purpose I provide a U-clamp as at 48 and a spring fastener as at 49. Depending upon the size of the pellets in the sample, different screens are employed in the testing procedure as follows:

1. For pellets smaller than ten sixty-fourths inches a No. 10 mesh screen is used where the screen opening is 0.080 inches and the wire size is 0.020 inches;
2. For pellets ten sixty-fourths inches to and including twenty-four sixty-fourths inches a No. 6 mesh screen is employed which has a screen opening of 0.132 inches and a wire size of 0.035 inches; and
3. For pellets having a size of ½ inch cubes or longer a No. 2 mesh screen is employed wherein the screen openings are 0.446 inches with a wire size of 0.054 inches.

The fines from the tumbling operation are advantageously collected in a pan 50 (see particularly FIG. 4) which is conveniently mounted on the base 12 and which is positively located by guides 51.

In the operation of the preferred testing procedure, a hot pellet sample is taken from the output of the pellet machine (not shown) with excellent results being obtained when a quantity of about 600cc is employed. For example, a beaker type receiver 52 (FIG. 1) is employed for this purpose and is completely filled from the full stream of hot pellets from the die of the pellet machine. The pellet sample is not packed down but is carefully filled and placed within the container 10 as soon as possible after collection. The pellets from the sample are normally supported by the screen 22 and the container 10 is advantageously equipped with a heavy duty viewing window as at 53. With the lid 17 uppermost the brake arm 32 engaged with the sprocket 27 the sample of hot pellets is placed within the container 10 by spreading the pellets over the full area of the screen 22. The flexible coupling or hose 21 is inserted into the opening 18 and the blower unit 11 is operated for 5 minutes — this being ascertained through the use of the timer 44. After this has been done, the hose 21 is removed and the rotatable cover 19 is pivoted to close the opening 18.

After cooling, the fines must be removed from the pellets which fines normally are removed by the production screen during the normal commercial run. This is done by placing the handle 28 in a horizontal position, removing the sprocket 27 from coupling both with the disc 25 and the brake arm 32 — thereby making the container 10 free wheeling. The container 10 is rocked back and forth approximately 10 times to limitly agitate the pellets so as to remove the fines therefrom. This promotes a rolling of the pellets across the screen 22 a number of times corresponding to the rocking operation.

The normally removable fines, after passing through the screen 22, fall into the pan 50 which is emptied and returned into position between the guides 51. Thereafter, the enclosure 36 is closed by means of rotating the openable part 38 to the condition seen in FIGS. 2-4.

After the enclosure 36 is latched closed, the handle 28 is moved to couple the motor 23 to the container 10. The timer is set for 3 minutes and the switch 35 set to the position wherein the motor is actuated. The pellets are then tumbled for 3 minutes, with the fine particles passing through the screen 22 being directed by the converging lower portion of the wall 39 through the discharge outlet 54 into the pan 50. After the tumbling has been completed, the enclosure portion 38 is tapped to discharge any fine particles which have stuck thereto. After knocking the fines into the pan 50, the fines are transferred to a graduate as at 55 (FIG. 1) and the level ascertained. Using the foregoing procedure, any collection of the fines in excess of 10 cc for a poultry or dairy feed is considered unacceptable. For pellets intended for hog rotation, accumulations of fines up to 33 cc are acceptable.

As pointed out previously, the rotating container 10 is constructed with a provision for quickly changing the screens so that different sized screens could be used for different sized pellets. This makes possible the use of the measuring proceedure and device to give the manufacturer an evaluation of the acceptability of the pellets before the cooler receiver is full and cold.

While in the foregoing specification a detailed description of the invention has been set down for the purpose of illustration, many variations of the details herein given may be made by those skilled in the art without departing from the spirit of the scope of the invention.

I claim:

1. In a method for determining the durability of pellets, the steps of introducing a predetermined-sized sample of pellets from the output of a pellet making machine into a screened-walled container, cooling the sampled pellets, limitedly agitating the container and separating fine particles from the pellets, tumbling the said container for a pre-determined time while collecting the fine particles exiting through said screened wall, and comparing the thus collected fine particles against a pre-determined standard.

2. The method of claim 1 in which the mesh size of the screen of said container is increased with larger sized pellets.

3. The method of claim 1 in which the step of cooling is achieved by forcing room air through said container while otherwise maintaining the sample in unagitated condition.

4. The method of claim 1 in which the step of limited agitation includes rocking said container a few times to remove those fine particles normally removed by screening during a production run.

5. In a method for determining the durability of pellets, the steps of introducing a pre-determined-sized sample of pellets from the output of a pellet making machine into a screened-walled container, the size of the openings of said screen being selected to correlate to the size of the pellets, cooling the sampled pellets by forcing air through said container while otherwise maintaining the sample pellets in unagitated condition, limitedly agitating the container and separating the fine particles therefrom to remove those fine particles normally removed during screening during a production run, tumbling the said container for a pre-determined time while collecting the fine particles exiting through said screened-wall, and comparing the thus collected fine particles against a pre-determined standard.

6. Apparatus for determining the durability of pellets comprising a base, a frame on said base, a shaft journalled for rotation in said frame, a pellet sample container mounted at one end of said shaft, motor means on said frame equipped with clutch means for selectively rotating said shaft and container, an enclosure on said frame surrounding said container and having a bottom discharge below said container, said container having a screened wall adapted to be rotated about a horizontal axis so as to pass fine particles to said discharge, said enclosure having a portion thereof selectively openable to permit access to said container, and means on said base for receiving fine particles from said discharge; said frame being equipped with a blower, and a flexible conduit selectively coupling said blower with said container for cooling said pellet sample when said enclosure portion is open.

7. The apparatus of claim 6 in which said enclosure has the profile of an inverted tear-drop and includes a plate-like rear wall fixed to said frame, a spaced-apart front wall generally parallel to said rear wall and conforming to said inverted tear-drop shape, an apertured side wall fixed to said front wall and pivotally related to said rear wall to provide said openable portion.

* * * * *

PO-1050
(5/69)

UNITED STATES PATENT OFFICE
CERTIFICATE OF CORRECTION

Patent No. 3,766,776     Dated October 23, 1973

Inventor(s) MERL A. WILLIAMS

It is certified that error appears in the above-identified patent and that said Letters Patent are hereby corrected as shown below:

The name of the Assignee (appearing on page 1 of the printed matter) should be changed from CENTRAL SOYA COMPANY to CENTRAL SOYA COMPANY, INC., Signed and sealed this 12th day of March 1974.

(SEAL)
Attest:

EDWARD M. FLETCHER, JR.
Attesting Officer

C. MARSHALL DANN
Commissioner of Patents